Dec. 14, 1971 A. G. BLAKE 3,626,573
ELECTRODE HANDLING DEVICE
Filed Jan. 15, 1970 3 Sheets-Sheet 3
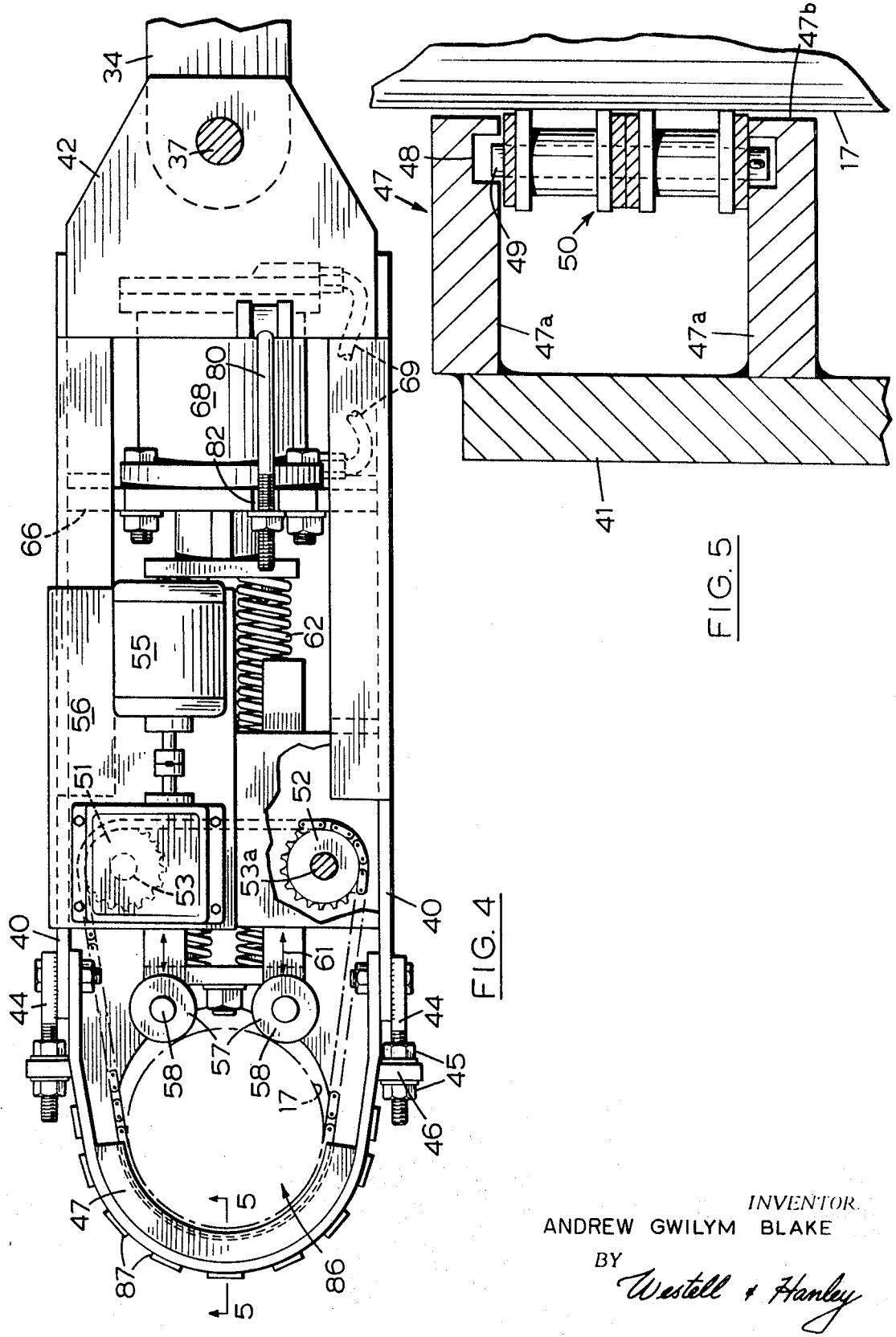
INVENTOR.
ANDREW GWILYM BLAKE
BY Westell & Hanley United States Patent Office 3,626,573
Patented Dec. 14, 1971

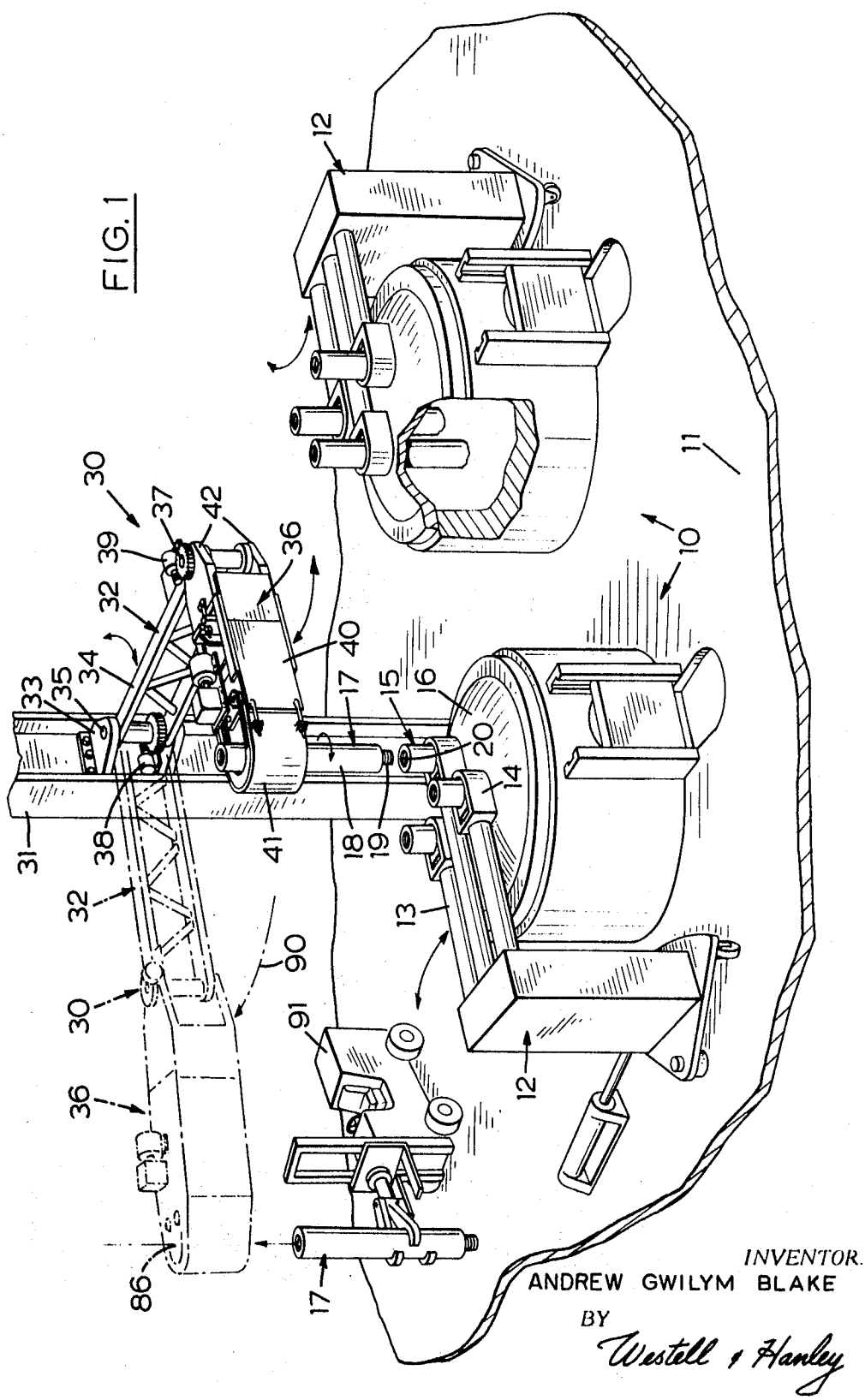

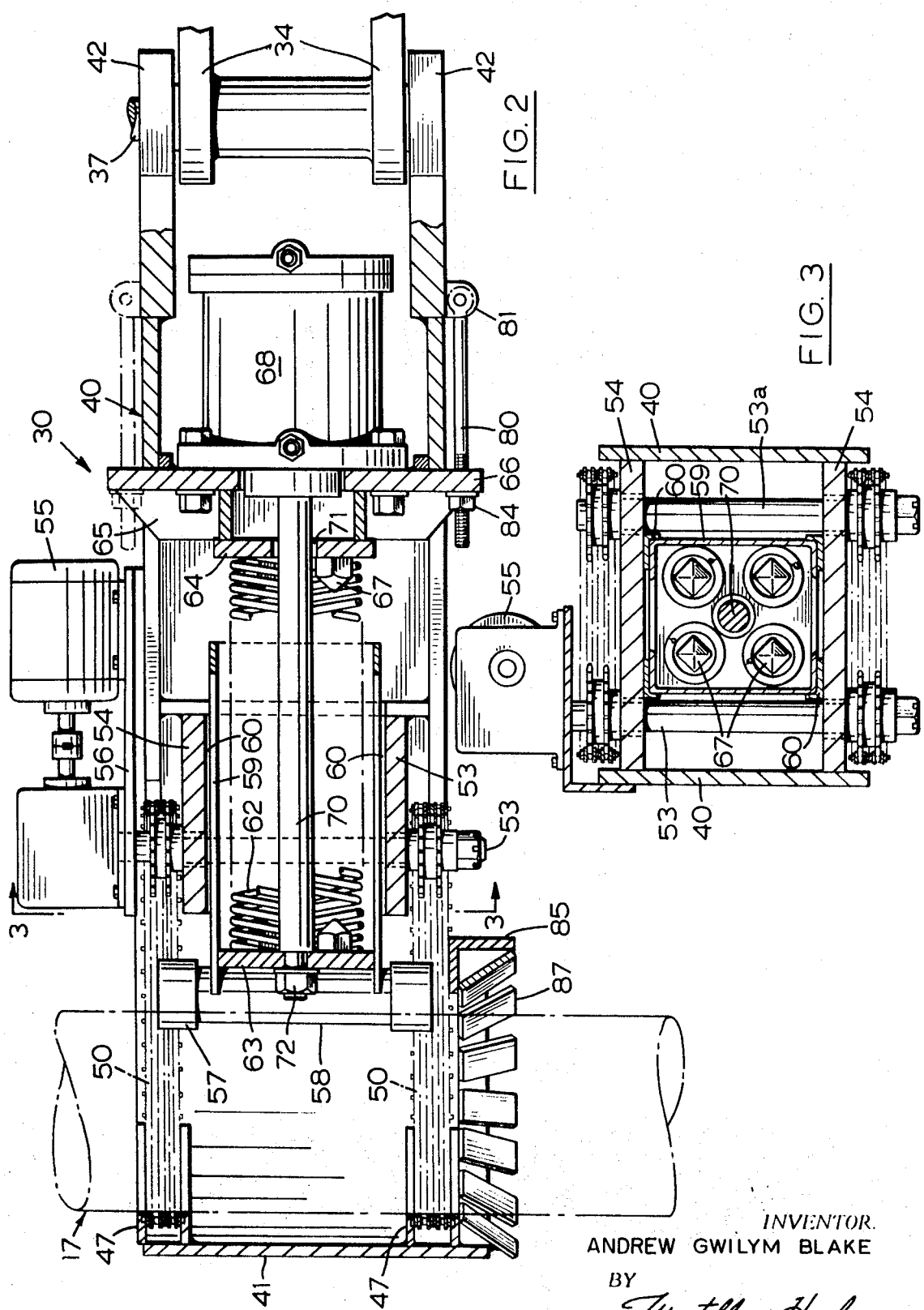

3,626,573
ELECTRODE HANDLING DEVICE
Andrew Gwilym Blake, Oshawa, Ontario, Canada, assignor to Lake Ontario Steel Company Limited, Whitby, Ontario, Canada
Filed Jan. 15, 1970, Ser. No. 3,014
Int. Cl. B23p *19/04;* H05k *13/00*
U.S. Cl. 29—203                                              8 Claims

ABSTRACT OF THE DISCLOSURE

An electrode handling device for an electric arc furnace, in which threaded electrode sections are attached to electrodes mounted in the furnace to provide a continuous electrode feed. The device grips the electrode section, locates the section in line with the mounted electrode, and rotates the section to thread it onto the electrode.

---

The present invention relates to electric arc furnaces and more particularly to a device for handling electrode sections to form continuous electrodes feeding into an electric arc furnace.

In one method of obtaining liquified steel, scrap is charged into an electric arc furnace having a number of electrodes arranged to project into the furnace. These electrodes are fed by electricity at medium voltage to cause arcing between the electrodes and the steel scrap which causes the scrap to melt. Continuous arcing slowly erodes the electrodes and to maintain their position relative to the charge for optimum arcing they must be continuously advanced into the furnace, usually by means of a hydraulic jack which lowers each electrode into the furnace as required. To provide for continuous advancement of the electrodes they are supplied in sections each carrying a threaded socket at each end whereby the sections may be fixed end to end by interconnecting threaded nipples. As the bottom end of each electrode section is eroded in the furnace and the electrode is advanced downwardly to compensate for the erosion, a further electrode section is added to its top end as an extension. This is cumbersome since it must be done manually with the air of an overhead crane to lift each electrode section which normally is six feet in length, from eight inches to twenty-four inches in diameter depending in the capacity of the furnace, and weighs up to a thousand pounds. An electrode section erodes in approximately twelve hours and each replacement takes up to ten minutes of labour in addition to tying up the crane. Another important disadvantage of manually connecting the electrode sections is the danger and discomfort to the workmen carrying it out, because of the high temperature of the furnace. Application of the proper tightening torque is also difficult, resulting in failure of the joint.

It is an object of the present invention to provide an apparatus for automatically orienting and attaching electrode sections to form a continuous electrode feeding into an electric arc furnace.

An example embodiment of the invention is shown in the accompanying drawing in which:

FIG. 1 is a view in perspective of a pair of electric arc furnaces with an electrode handling and threading device servicing the furnaces;

FIG. 2 is a view in elevation, partly in cross-section, showing the main body of the threader of FIG. 1;

FIG. 3 is a cross-section taken along the line 3—3 of FIG. 2;

FIG. 4 is a plan view, partly broken away, of the device shown in FIG, 2; and

FIG. 5 is a cross-section taken along the line 5—5 of FIG. 4.

In the drawings, FIG. 1 shows a pair of electric arc furnaces 10 of conventional design supported on a suitable base 11 such as concrete flooring. A movable electrode holder or mount 12, one associated with each furnace 10, carries a plurality of bus bars 13, cantilevered over furnace 10, which each terminate in a pneumatic clamp 14. Each clamp 14 holds an electrode 15 above furnace 10 and the electrode projects downwardly into the furnace through suitable ports in roof 16 of the furnace. Clamp 14 is adapted to lower or raise electrode 15 to provide proper arcing within furnace 16. Each electrode 15 consists of sections 17 each having a cylindrical body portion 18 of graphite with a threaded socket 20 in each end of the body portion and a threaded nipple 19 screwed into one of the sockets. The axes of nipple 19, socket 20 and body portion 18 of each electrode section 17 are co-extensive whereby the nipple of one electrode section may be engaged with a socket of another electrode section to form a continuous electrode 15.

An electrode threader 30 is mounted on a fixed vertical column 31 located adjacent both furnaces 10. Threader 30 consists of an articulated, cantilever arm 32 mounted on a bracket 33 which is fixed on column 31. An inner brace 34 of arm 32 is fixed at one end on a vertical pin 35 journalled in bracket 33 for pivotal movement of brace 34 in a horizontal plane, and at its other end the brace carries a frame 36 fixed on a vertical pin 37 which is journalled in brace 34 for pivotal movement of the frame in a horizontal plane. Frame 36 carries an electrode gripping and rotating mechanism which is shown in detail in FIGS. 2–5 of the drawings. Pivot pins 35 and 37 are each connected with a gear and pinion rotating mechanism 38 and 39 respectively.

Frame 36 comprises side walls 40 having an arcuate flange 41 fixed at one end of the side walls and a pair of flanges 42, which hold pivot pin 37, fixed at their other end. Flange 41 is adjustably mounted on side walls 40 of frame 36 by threaded bolts 44 fixed to the side walls and engaging, by means of nuts 45, brackets 46 fixed to the flange. Flange 41 carries a pair of upper and lower horizontal arcuate tracks 47 each formed by a pair of horizontal plates 47a having a pair of inwardly facing grooves 48. The ends of transverse link pins 49 of a pair of endless chains 50 slide loosely in grooves 48 of tracks 47 and each chain extends beyond the ends of the tracks to pass around a drive sprocket 51 and an idler sprocket 52. Spaced upper and lower drive sprockets 51 are keyed on a common vertical shaft 53 which is journalled in a pair of spaced horizontal plates 54 fixed to side walls 40 of frame 36, while upper and lower spaced idler sprockets 51 are keyed on a common vertical shaft 53a also journalled on plates 54. Shaft 53 is connected with a drive motor 55 mounted on a platform 56 fixed on one side wall 40 of frame 36. Shaft 53a is adjustable laterally in plates 54 to compensate for wear of chains 50. The radius of curvature of arcuate flange 41, and hence the radius of the curvature of chains 50 travelling in tracks 47, is approximately the same as, or slightly greater than, the radius of an electrode section 17. Tracks 47 are slightly less than 180° in curvature and sprockets 51 and 52 are spaced apart a distance to locate chains 50 tangentially to the ends of the tracks, as seen best in FIG. 4 of the drawings. Grooves 48 in tracks 47 are located adjacent the free edge 47b of each plate 47a of the tracks to allow chains 50 to project laterally beyond edges 47b as seen in FIG. 5 of the drawings.

Two spaced pairs of rollers 57 are journally mounted on a pair of vertical pins 58 which are disposed opposite tracks 47 and within the space bounded by chains 50, as seen in FIGS. 2 and 4 of the drawings. Pins 58 are fixed on a frame 59 which is slidable horizontally between flanges 60 fixed to plates 54 in frame 36 to move rollers 57 relative to tracks 47, in the direction indicated by arrows 61 in FIG. 4. Slidable frame 59 is urged toward tracks 47 by a number of compression springs 62 acting at one end against a vertical plate 63 on frame 59 and at the other end against a vertical plate 64 fixed on a bracket 65 to an end plate 66 which is in turn fixed to side walls 40 of frame 36. Studs 67 fixed on the faces of plates 63 and 64 locate the ends of the springs on the two vertical plates. An air cylinder 68 is fixed on the side of plate 66 opposite bracket 65 and is fed by lines 69 to actuate a piston rod 70 extending slidably through an aperture 71 in plate 64, the free end of the rod being threaded and fixed to plate 63 by a nut 72. Rod 68 acts to restrain plate 63 and rollers 57 against the action of compression spring 62. Rollers 57 are located in pairs adjacent the planes of chains 50.

End plate 66 is detachably mounted on flanges 42 by a pair of bolts 80 which are pivotally connected at one end to a bracket 81 fixed on flanges 42 and releasably help adjacent the other end in slots 82 of the vertical end plate by nuts 84 threaded on the free ends of bolts 80.

An arcuate, flanged plate 85, extending from frame 41 to meet the ends of lower track 47 of flange 40, forms with lower track 47 a circumferential aperture opening upwardly into a cylindrical passage 86. A ring of plates 87 are fixed to flange 40 and plate 85 to form a funnel opening downwardly from passage 86 which is slightly greater in diameter than electrode section 17.

In the operation of the described embodiment, electrode threader 30 in its normal position of rest is swung away from above furnaces 10. This is done by the action of gear 38 pivoting arm 32 about pin 35, as shown in phantom in FIG. 1. To attach a new section 17 to electrode 15, the new section is fed upwardly through aperture 86 of frame 36, guided by funnel 87. In the illustrated embodiment a fork lift truck 91 is used to insert electrode section 17 into passage 86.

To receive and grip electrode section 17 in passage 86, rollers 57 are drawn back from the area of the passage by the action of rod 70 which is retracted (to the right as seen in FIGS. 2 and 4 of the drawings) by air cylinder 68 against the action of compression springs 62. When electrode section 17 has been located in passage 86, cylinder 68 releases rod 70 which allows spring 62 to move rollers 57 against the electrode section and hold the section against chains 50 (see FIG. 5). Electrode section 17 is then swung above one of furnaces 10, and more particularly directly above the one electrode 15 to be extended, by actuating gears 38 and 39. It will be appreciated that electrode section 17 is positioned in threader 30 in a manner such that stud 19 of section 17 faces socket 20 of electrode 15 when the section is swung above the electrode projecting from the furnace, as shown in FIG. 1. Electrode 15 is raised by jack 14 to meet electrode 15 and then the section is threaded into the electrode by actuating motor drive 54 which rotates shaft 53 and sprockets 51 to drive chains 50 which are in frictional contact with the electrode section. As the electrodes are threaded together, the electrode slips transversely on chains 50. The torque exerted on electrode section 17 is determined by the force of compression springs 62 acting on rollers 57 which bear laterally on the section, and after the new section has been tightened on electrode 15 to a predetermined degree, chains 50 will thereafter slip on the new section. IIt will be appreciated that interlocking means other than threads, but using a rotational movement as between the interlocking members, may be employed.

When new section 17 has been interlocked with electrode 15, rollers 57 are retracted by cylinder 68 and electrode 15 is moved downwardly by jack 14 clear of threader 30 to allow the threader to be returned to its original position of rest.

As an alternative to moving electrode section 17 upwardly into passage 86 of threader 30 and/or moving electrode 15 downwardly to clear it of the threader after the section has been attached to the electrode, cantilever arm 32 could be made transversely movable vertically by having bracket 33 movably mounted on column 31.

It should be noted that the spring pressure of compression springs 62 used to hold rollers 57 against electrode section 17 acts as a safety device and failure of the actuating mechanism, for instance by the rupture of lines 69 of air cylinder 68, will not cause the electrode section to drop from threader 30.

The torque applied by chains 50 to electrode section 17 is controlled by the force of rollers 57 acting on the electrode section. Thus by controlling the compressive force of springs 62, the proper torque applied to electrode section 17 will join it to electrode 15 without risk of joint failure.

I claim:
1. An electrode handling device for an electric arc furnace, comprising:
   means to grip an electrode section and to rotate the electrode section about its longitudinal axis, said gripping and rotating means comprising (1) a pair of sprocket driven endless chains spaced one from another and lopped to receive the electrode section, (2) roller means moveable transversely to the electrode section to hold the section in frictional engagement with the endless chains, and (3) means to move the endless chains longitudinally; and
   means to move the gripping and rotating means to locate the electrode section adjacent at least one electrode mounted in the furnace and projecting therefrom, the electrode section being engageable with the electrode by the axial rotation of the electrode section to form an extension of the electrode.

2. A device as claimed in claim 1 in which each chain travels loosely along an arcuate track, said roller means comprising at least one pair of rollers opposed to the chains, the rollers forming with the chains a passage for the longitudinal insertion of the electrode section.

3. A device as claimed in claim 2 in which the rollers are held by fluid actuated means against the action of at least one compression spring and are releasable by the fluid actuated means to bear laterally against the electrode section in the direction of the chains.

4. An electrode handling device for an electric arc furnace, comprising:
   a cantilever arm movable transversely and articulated intermediate its length;
   electrode section gripping means carried by the arm adjacent its free end and comprising a pair of spaced, endless bands looped to form a passage for an electrode section inserted axially therethrough, and roller means movable laterally to hold an electrode in frictional engagement with the bands;
   means to move the bands to rotate an electrode section engaged by the bands; and means to move the roller means laterally of the electrode section.

5. A device as claimed in claim 4 in which the endless bands are sprocket driven chains held in looped position by arcuate tracks of a radius at least as great as the radius of the electrode.

6. A device as claimed in claim 4 including a downwardly and outwardly flaring flange fixed below the endless bands to form a funnel for guidance of an electrode section into said passage.

7. A device as claimed in claim 4 in which the roller means comprise pairs of rollers, each pair located within, or adjacent, the planes of one of the endless bands.

8. A device as claimed in claim 4 in which the roller means are moveable by compression spring means controlled by pneumatic means.

References Cited

UNITED STATES PATENTS 3,377,686  4/1968  Carpenter _____ 29—240

THOMAS H. EAGER, Primary Examiner

U.S. Cl. X.R.

29—240